Oct. 30, 1951  A. E. POLINSKE  2,573,056
OPTICAL LENS ALIGNER
Filed March 4, 1948  2 SHEETS—SHEET 1
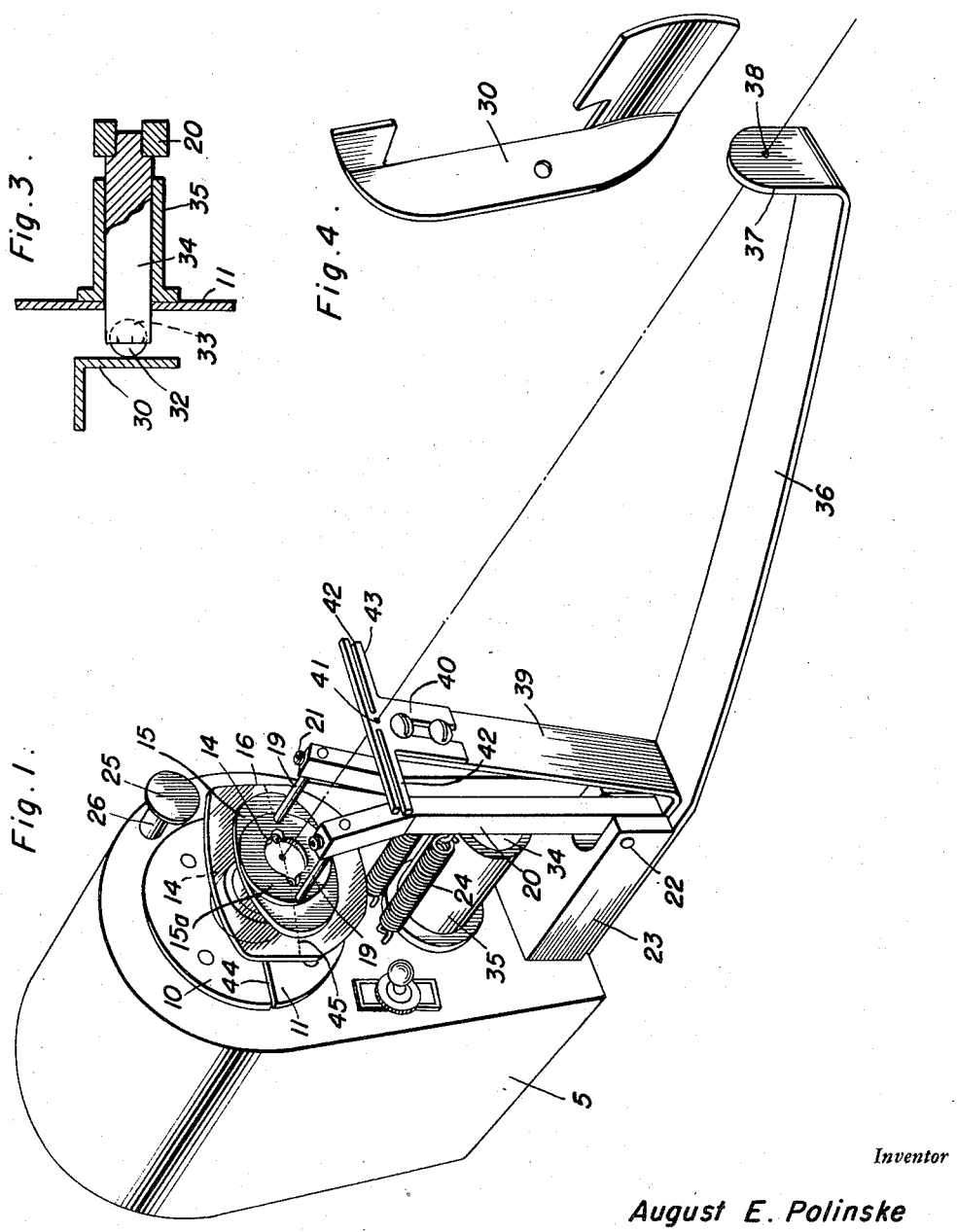
Inventor
August E. Polinske
By Clarence A. O'Brien
and Harvey B. Jacobson
Attorneys Oct. 30, 1951  A. E. POLINSKE  2,573,056
OPTICAL LENS ALIGNER
Filed March 4, 1948  2 SHEETS—SHEET 2
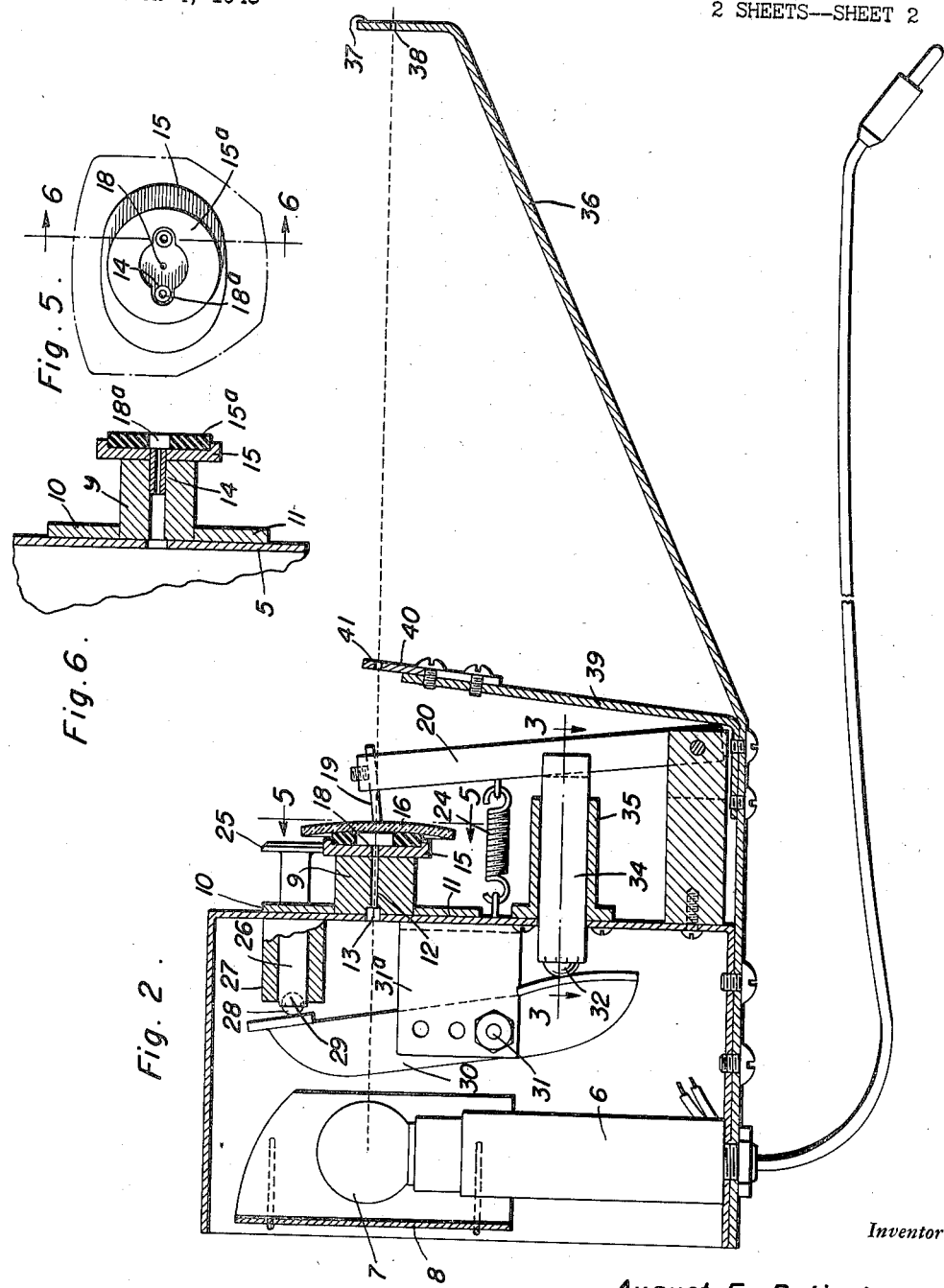
Inventor
August E. Polinske
By Clarence A. O'Brien
and Harvey B. Jacobson
Attorneys Patented Oct. 30, 1951

2,573,056

UNITED STATES PATENT OFFICE 2,573,056

OPTICAL LENS ALIGNER

August E. Polinske, Wausau, Wis.

Application March 4, 1948, Serial No. 12,922

7 Claims. (Cl. 88—56)

The present invention relates to new and useful improvements in optical lens aligners used in connection with the grinding of optical lenses.

An important object of the invention is to provide means for properly aligning and holding a lens in a lens holder through the provision of a peep sight supported in front of the lens and lens holder.

A further object is to provide novel means for releasing the lens and lens holder after alignment of the lens for placing the same in a lens grinding machine.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the lens aligner;

Figure 2 is a longitudinal sectional view thereof;

Figure 3 is a longitudinal sectional view of the push rod for the lens holding arms taken substantially on the line 3—3 of Figure 2;

Figure 4 is a perspective view of the rocker arm for the push rod;

Figure 5 is a fragmentary front elevational view of the lens holder plate; and,

Figure 6 is a vertical sectional view taken on a line 6—6 of Figure 5.

Referring now to the drawings in detail wherein for the purpose of illustration I have disclosed a preferred embodiment of the invention, the numeral 5 designates a housing which is open at its back and having a lamp socket 6 suitably supported therein in an upright position with a lamp 7 mounted in its upper end. An arcuate reflector 8 is suitably supported in the housing behind the lamp 7.

A lens holding block 9 is held against the front of the housing 5 by means of upper and lower plates 10 and 11 secured to the housing, the block having an opening 12 extending therethrough from front to rear in alignment with an opening 13 in the front wall of the housing and in horizontal alignment with the axis of lamp 7. A pair of hollow pins 14 project forwardly from the block 9 at diametrically opposite sides of the opening 12, and in a horizontal plane therewith, and on which an apertured lens holding plate 15 having a rubber cushion 15a is removably supported. The plate 15 and cushion 15a are provided with central openings 18 in alignment with the opening 12 and side openings 18a in alignment with pins 14.

The lens holding plate 15 with a lens 16 placed against cushion 15a are held in position on the pins 14 of the lens holding block 9 by means of a pair of rearwardly extending pins 19 held in the upper ends of a pair of upstanding arms 20 for forward and rearward sliding adjustment by set screws 21, the arms 20 being pivoted at their lower ends on a pin 22 supported forwardly of the housing 5 by a bracket 23. The arms 20 are pulled rearwardly to hold the pins 19 against the lens by coil springs 24 extending from the arms to the front wall of the housing 5.

A release button 25 is formed at the outer end of a plunger 26 slidably mounted in a guide 27 in the upper portion of the front wall of the housing, the rear end of the plunger having a ball 28 held in a socket 29 by contracting the rear end of the plunger over the ball.

A rocker arm 30 is pivoted for vertical swinging movement on a pin 31 and bracket 31a on the inside of the housing with the upper end of the rocker arm engaged by the ball 28 and the lower end of the rocker arm engaged by a similar ball 32 held in a socket 33 at the inner end of a push rod 34 slidable in a guide 35 projecting forwardly from the front wall of the housing, the outer end of the push rod engaging the arms 20.

A rear sighting arm 36 is attached to the underside of housing 5 and extends rearwardly and upwardly therefrom and terminating in an upstanding rear sight 37 having a sight opening 38 therein.

A front sighting arm 39 is attached to the arm 36 in an upstanding position between lens holding block 9 and rear sight 37, the upper end of arm 39 having a T-shaped front sight 40 secured in vertically adjusted position thereto and provided with a central front sighting opening 41, the openings 38 and 41 being horizontally alined with opening 12 in block 9.

Horizontal sighting slots 42 are formed in the arms 43 of front sight 40 alining with the openings 18a of lens plate 15, the openings of hollow pins 14 and with horizontal slots 44 between the edges of plates 10 and 11 at opposite sides of block 9.

In the operation of the device, a lens 16 is held against cushion 15a of lens plate 15 by a conventional type of clamping tongs (not shown) for convenient handling thereof in assembled relation and the plate 15 is positioned on pins 14 and held thereon by the pins 19 and arms 20 bearing against the lens as shown in Figure 1. The lens is previously marked with a horizontal center line 45 and by aligning sights 38 and 41 with central illuminated openings 13 and 18 and also aligning sighting slots 42 with illuminated hollow pins 14 and slots 44 in the front end of housing 5 the marking 45 on the lens may be aligned with the sights.

The clamping tongs are then used to lift the alined lens and plate 15 from the pins 14 after releasing pins 19 by pressing plunger 26 inwardly and the lens and plate then placed in a lens grinding machine.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a lens aligner including a housing having an apertured lens holding block supported at the front of the housing and a sighting means disposed in front of and carried by said housing in substantial alignment with the aperture in said block, a lens holding means comprising a pair of upstanding lens holding arms, pivot means at the front of the housing for the lower ends of the arms, means at the upper ends of the arms adapted to bear against a lens under test adjacent its side edges for holding the lens against the block and in alignment with said sighting means, a push rod slidably supported in the front of the housing and with the front end of the push rod engaging the arms, a rocker arm pivoted in the housing with one end engaging the rear end of the push rod, and a push button slidably mounted in the front of the housing in operative engagement with the other end of the rocker arm to swing the lens holding arms forwardly into lens releasing position.

2. A lens aligner comprising a lamp housing having an illuminated opening, a pair of illuminated hollow pins projecting from the housing at diametrically opposite sides of the opening, illuminating means in the housing behind the opening and pins, a lens holding plate having apertures supported on said pins and also having a central aperture aligned with said opening, lens holding means supported at the front of the housing and adapted for holding a lens under test against the outer surface of the plate, said lens having a horizontal aligning mark, front and rear peep sights supported by the housing in front of the lens and aligned with said aligned aperture and opening, and horizontal sighting slots carried by one of the sights aligned with the hollow pins and with the horizontal aligning mark on the lens.

3. A lens aligner comprising a lamp housing having an illuminated opening, a pair of illuminated hollow pins projecting from the housing at diametrically opposite sides of the opening, said housing also having illuminated slots at opposite sides of said pins and in the horizontal plane of the opening and pins, illuminating means in the housing behind the opening and also behind the hollow pins and the slots, a lens holding plate supported on said pins and having apertures aligned with the pins and also having a central aperture aligned with said illuminated opening, lens holding means supported at the front of the housing and adapted for holding a lens under test against the plate, said lens having a horizontal aligning mark, front and rear peep sights aligned with said illuminated opening and with said central aperture, and horizonal sighting slots carried by one of the sights aligned with the hollow pins and with said illuminated slots to align the aligning mark of the lens therewith.

4. A lens aligner comprising a lamp housing having an opening in its front, lens holding means supported at the front of the housing over said opening and having a central opening and a pair of side openings registering with the opening in the front of the housing, a rear horizontal sighting element on the front of the housing extending laterally at each side of the lens holding means, said lens holding means being adapted for holding a lens having a horizontal aligning mark under test with said mark aligned with said rear horizontal sighting element, and front and rear peep sights supported by the housing in front of the lens, each of said sights having peep openings adapted for aligning with the central openings, said rear sight also having horizontal sighting slots at opposite sides of its peep opening, and said marking on the lens being aligned with said rear sighting element and with said slots when said marking on the lens intersects both the central and side openings.

5. A lens aligner comprising a lamp housing having an opening in its front, lens holding means supported at the front of the housing over said opening and having a central opening and a pair of side openings registering with the opening in the front of the housing, a rear horizontal sighting slot in the front of the housing extending laterally at each side of the lens holding means, said lens holding means being adapted for holding a lens having a horizonal aligning mark under test with said mark aligned with said rear horizontal sighting slot, a front peep sight supported by the housing in front of the lens, and a T-shaped rear peep sight supported by the housing behind the front sight, said rear sight having a central peep opening adapted for aligning with the front peep sight and with said central openings, and said rear sight also having arms provided with horizontal sighting slots, and said marking on the lens being aligned with said first and second sighting slots when said marking on the lens intersects both the central and side openings.

6. The combination of claim 4 wherein said lens holding means comprises a fixed member supported by the housing and a lens holding plate in both of which the central and side openings are formed, hollow pins in the side openings of both the fixed member and in the lens holding plate to support the latter on the former and to maintain their corresponding openings aligned with each other, means carried by the housing adapted for engaging and clamping the lens against the lens holding plate, and illuminating means in the housing to project rays of light through the central openings and through the side openings and hollow pins onto the lens.

7. The combination of claim 4 wherein said lens holding means comprises a fixed member supported by the housing and a lens holding plate in both of which the central and side openings are formed, hollow pins in the side openings of both the fixed member and in the lens holding plate to support the latter on the former and to maintain their corresponding openings aligned with each other, and means supported at the front of the housing adapted for clamping a lens against the lens holding plate.

AUGUST E. POLINSKE.

REFERENCES CITED

The following references are of record in the file of this patent:

UNITED STATES PATENTS

| Number | Name | Date |
| --- | --- | --- |
| 1,164,795 | Emerson | Dec. 21, 1915 |
| 1,242,754 | Allen | Oct. 9, 1917 |
| 1,538,991 | Hill | May 26, 1925 |
| 1,556,550 | Tillyer | Oct. 6, 1925 |
| 1,721,161 | Maynard | July 16, 1929 |
| 1,958,275 | McCabe | May 8, 1934 |
| 2,042,565 | Tillyer | June 2, 1936 |
| 2,081,936 | Keenan | June 1, 1937 |
| 2,253,954 | Goddu | Aug. 26, 1941 |
| 2,290,566 | Lockhart | July 21, 1942 |

FOREIGN PATENTS

| Number | Country | Date |
| --- | --- | --- |
| 499,084 | Germany | May 31, 1930 |